May 31, 1932.                C. P. EISENHAUER                1,860,927
                                WATER SOFTENER
                        Filed Feb. 15, 1928    9 Sheets-Sheet 1

Fig.1.

Inventor
CHARLES P. EISENHAUER,
BY
Joshua and Joshua
Attorneys

May 31, 1932.  C. P. EISENHAUER  1,860,927
WATER SOFTENER
Filed Feb. 15, 1928  9 Sheets-Sheet 3

Inventor
CHARLES P. EISENHAUER,

Fig. 10.

May 31, 1932.  C. P. EISENHAUER  1,860,927
WATER SOFTENER
Filed Feb. 15, 1928   9 Sheets-Sheet 9

Fig. 14.

Inventor
CHARLES P. EISENHAUER,
By Toulmin and Toulmin
Attorneys

Patented May 31, 1932

1,860,927

UNITED STATES PATENT OFFICE

CHARLES P. EISENHAUER, OF DAYTON, OHIO, ASSIGNOR TO THE DURO COMPANY, OF DAYTON, OHIO, A CORPORATION OF OHIO

WATER SOFTENER

Application filed February 15, 1928. Serial No. 254,347.

My invention relates to water softeners.

It is my object to provide a hand controlled water softener which is fully controlled by two movements only of a master control handle, the application of brine and the refilling of the brine tank with fresh water being carried out automatically.

Referring to the drawings.

Referring to the drawings in detail, 1 is a softening tank. The bottom of the tank has an inlet pipe 2 while the top of the tank is provided with an outlet pipe 3. The master valve has a hard water inlet line 4 which communicates with the port 5 on its face 6. The face 6 has the face of the stator portion of the valve generally designated 7. On this face is mounted a rotor casing 8 retained in position by the bolts 9. This rotor casing contains within it the rotor 10 whose face 11 engages with the face 6 of the stator portion of the valve. The casing 8 of the rotor is sealed to the face of the stator by the washer 12. This casing 8 is so arranged that there is an annular passageway 13 within its wall, the two faces of said passageway being formed by the casing 8, one face by the rotor 10 and the other side by the face 6 of the stator. Behind the rotor is an annular passageway 14 in which the pressure fluid can accumulate and, by its pressure maintain the rotor 10 in engaging position with the stator face 6. The rotor is actuated by the shaft 15 actuated by the handle 16. The movement of this handle is limited by the stops 17 and 18. A screw washer and packing 19 prevent leakage around the shaft 15. The passageway 20 communicates with the drain pipe 21 that leads to the drain 22 while the pipe 2 is connected to the passageway 21' of the stator. The passageway 22a communicates with a port 22' while the passageway 20 communicates with a port 23. The port 24 communicates with the service line 25. 26 indicates an outlet port to the pipe 3. In the valve connected to pipe 3 is mounted an injector 27 associated with the restricted port 28. The passageway 29 forms a passageway for the brine line 30 attached thereto. The pipe 32, with a port 31, is the pressure pipe for controlling the refill valve.

*Brine valve and refill valve mechanism*

The pipe 30 is connected to the casing 33. It communicates with the passageway 34 that is controlled by the refill valve 35 mounted on the valve stem 36. This valve member 35 controls a port 37. The valve member 35 and the valve stem 36 are normally moved upwardly into closed position by the valve spring 38, one end of which rests upon the shoulder 39 of the sleeve 40 while the other end of which engages with the plate 41 on the upper end of the valve stem which in turn is connected with the plate 42 that it engages with the under side of the flexible diaphragm 43 that forms the bottom of the pressure chamber 44, the top of which is formed by the top casing 45 of the valve mechanism. The pressure pipe 32 is connected with this valve casing.

The pressure pipe 32 is further provided with a restricted passageway 46 that drains the chamber 44 over the diaphragm 43. The plate 41 is engaged at intervals by the locking finger 47 that is connected by the arm 48 to the float arm 49 which carries the float 50 in the brine tank 51. This arm 48 is pivoted at 52 to the bridge 53 which bridges the cover casing 45 to the cover casing 54 that forms the top of the pressure chamber 55 over the brine diaphragm 56, the diaphragm forming the lower part of the chamber 55. The under side of this brine diaphragm is engaged by the plate 57 carried on the end of the brine valve stem 58.

On this valve stem is the locking plate 59 engaged with the locking finger 60 which is connected at 62 to the locking finger 60 and to the housing 63 which supports the locking finger 60 slidably. The adjustment between the finger 47 and the finger 60 is brought about by the adjustment of the threaded sleeves 63 and 64 which join the two locking fingers together which are actuated by the common arm 48 connected with the float arm 49 and float 50.

The valve stem 58 is pressed upwardly by the spring 65 mounted on the shoulder 66 and engaging at its upper end the locking plate 59. The lower end of the valve stem carries the valve member 67 controlling the port 68. This port connects the passageway 69 and the passageway 70, the passageway 70 leading to the brine tank 51. 71 is a drain plug for the passageway 69. The chamber is connected with suitable pressure for actuation of the diaphragm 56 through the pipe 72 which enters the passageway 34 and receives its fluid pressure therefrom or is drained therethrough depending upon the direction of the liquid passing through the passageway 34.

Method of operation

Figure 1:
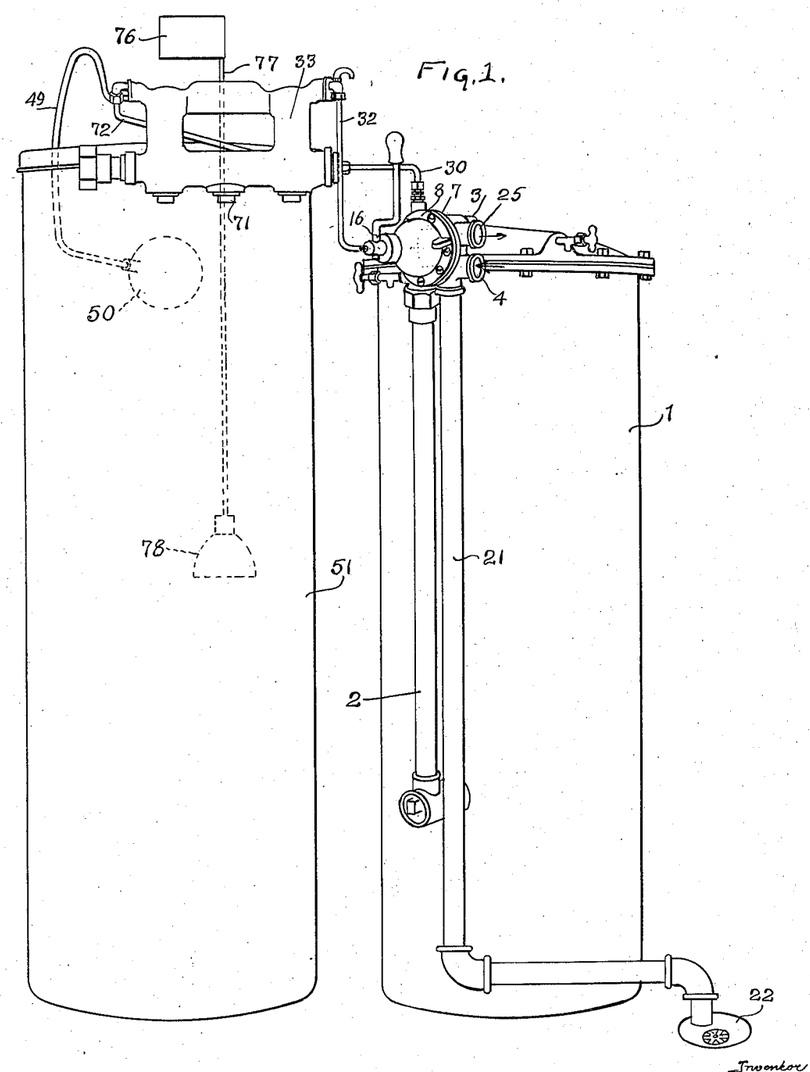
Figure 1 is a side elevation of the complete apparatus embodying my invention.
Figures 2, 3, 4:
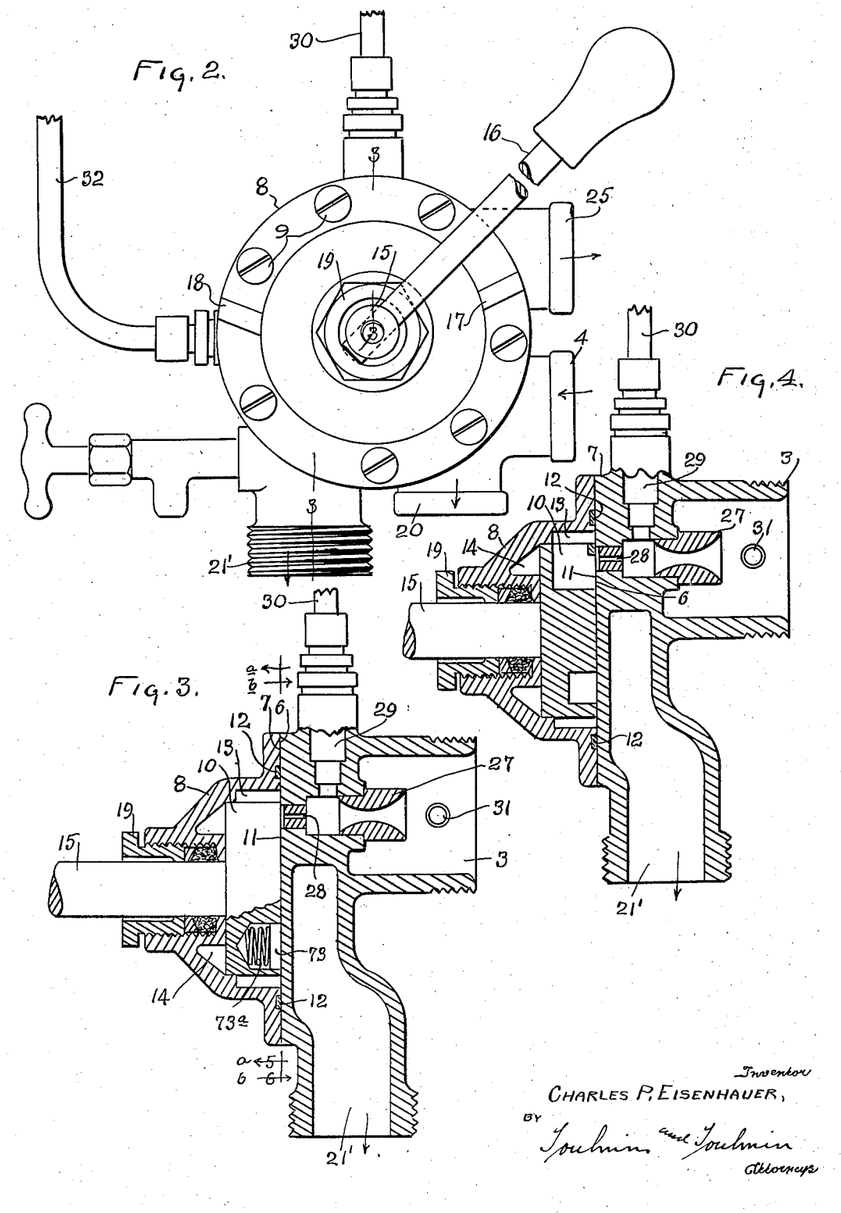
Figure 2 is a front elevation partially in section of the master control valve.
Figure 3 is a section on the line 3—3 of Figure 2 showing the valve in softening position.
Figure 4 is a similar section showing the valve in regenerating position.
Figure 5:
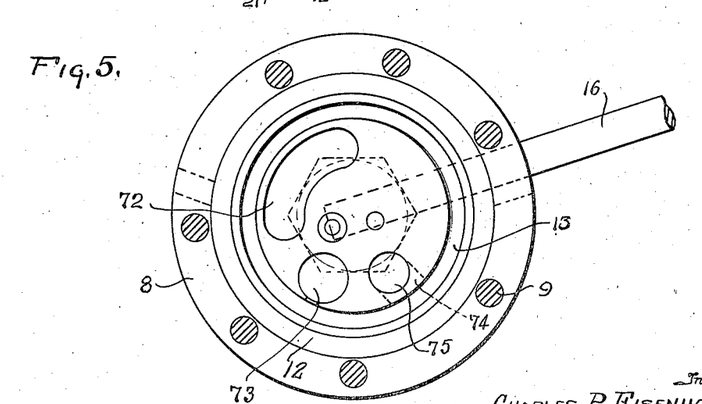
Figure 5 is a section on the line 5—5 of Fig. 3, looking in the direction of the arrows $a$ showing a front elevation of the valve in softening position.
Figure 6:
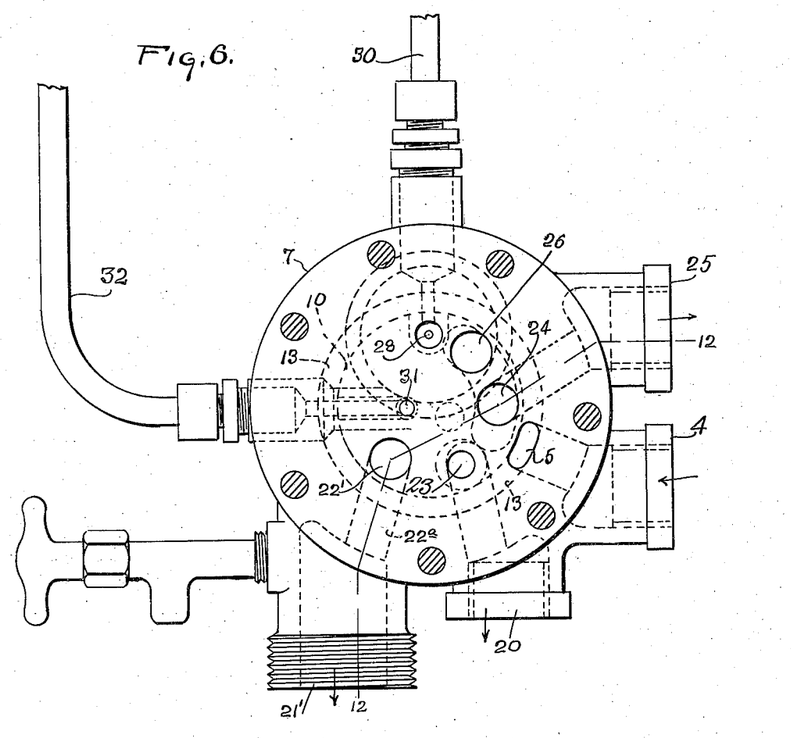
Figure 6 is a section on the line 6—6 of Figure 3 looking in the direction of the arrows $b$ at the face of the softener or stator portion of the valve showing in dotted lines the position of the ports of the rotor when in softening position.
Figure 7:
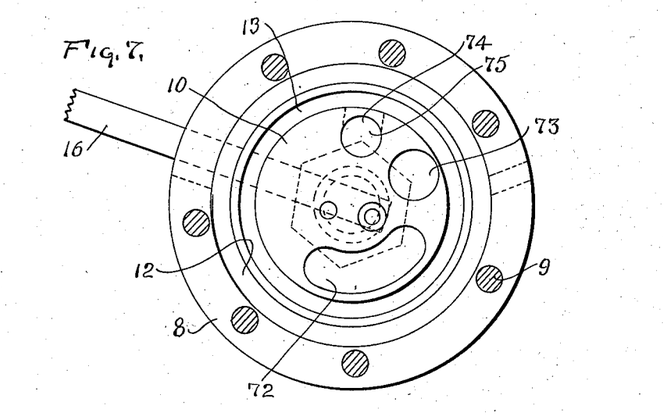
Figure 7 is a view similar to Figure 5 showing the rotor in regenerating position.
Figure 8:
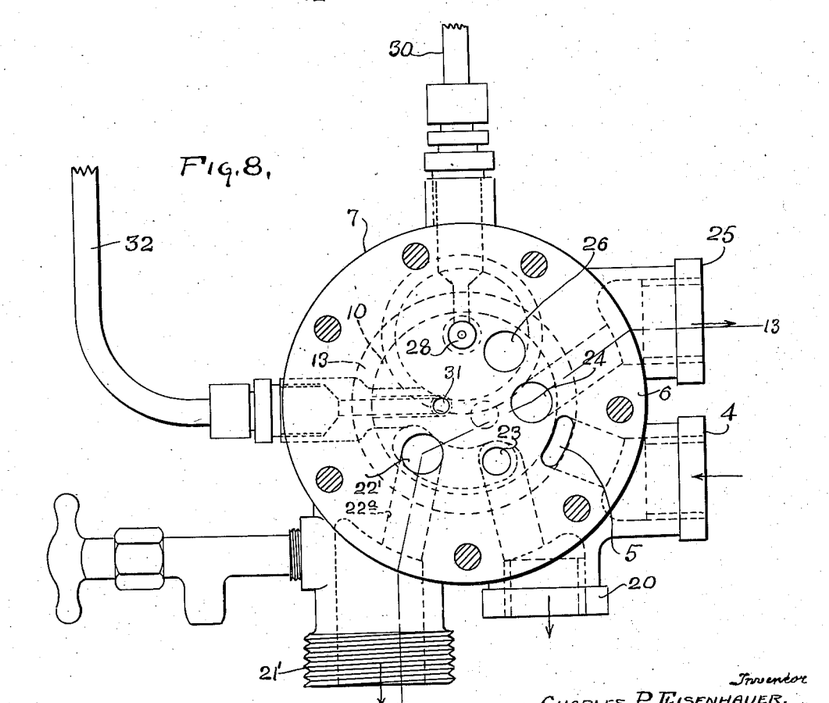
Figure 8 is a view similar to Figure 6 showing in dotted lines the position of the rotor ports in regenerating position.
Figure 9:
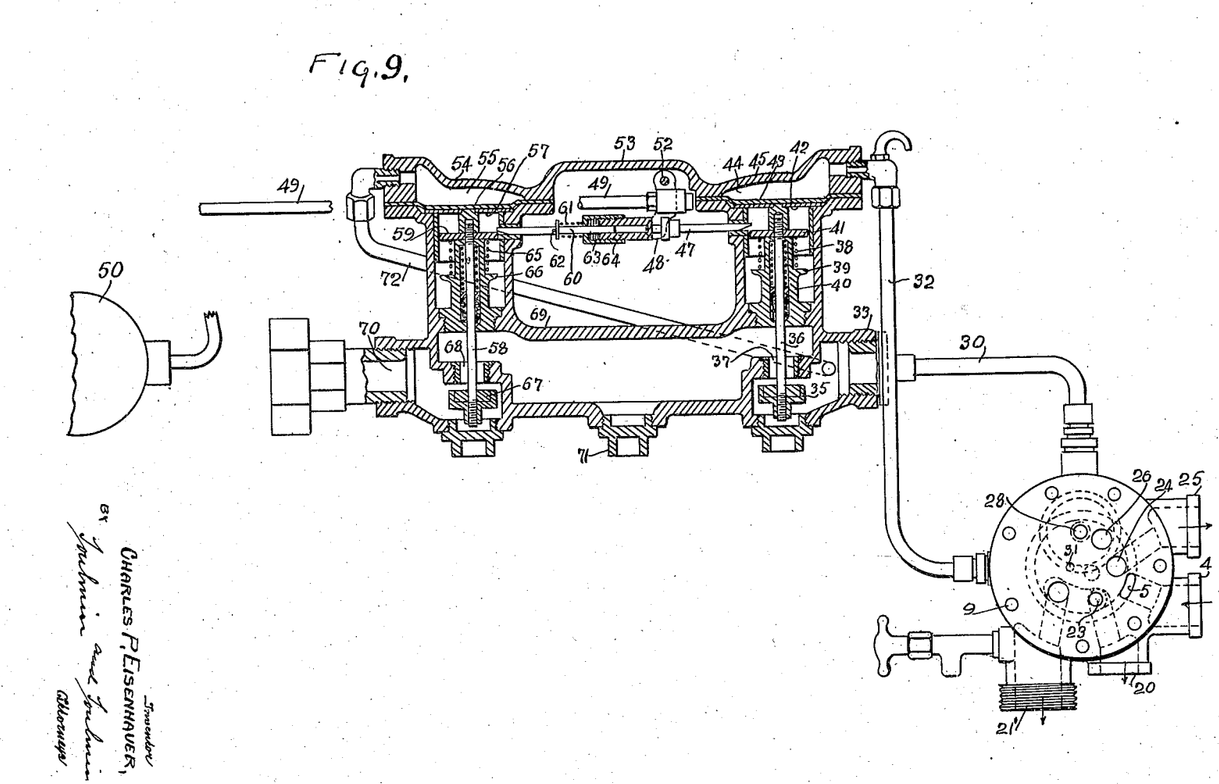
Figure 9 is a section through the brine and refill mechanism in position to supply brine.
Figure 10:
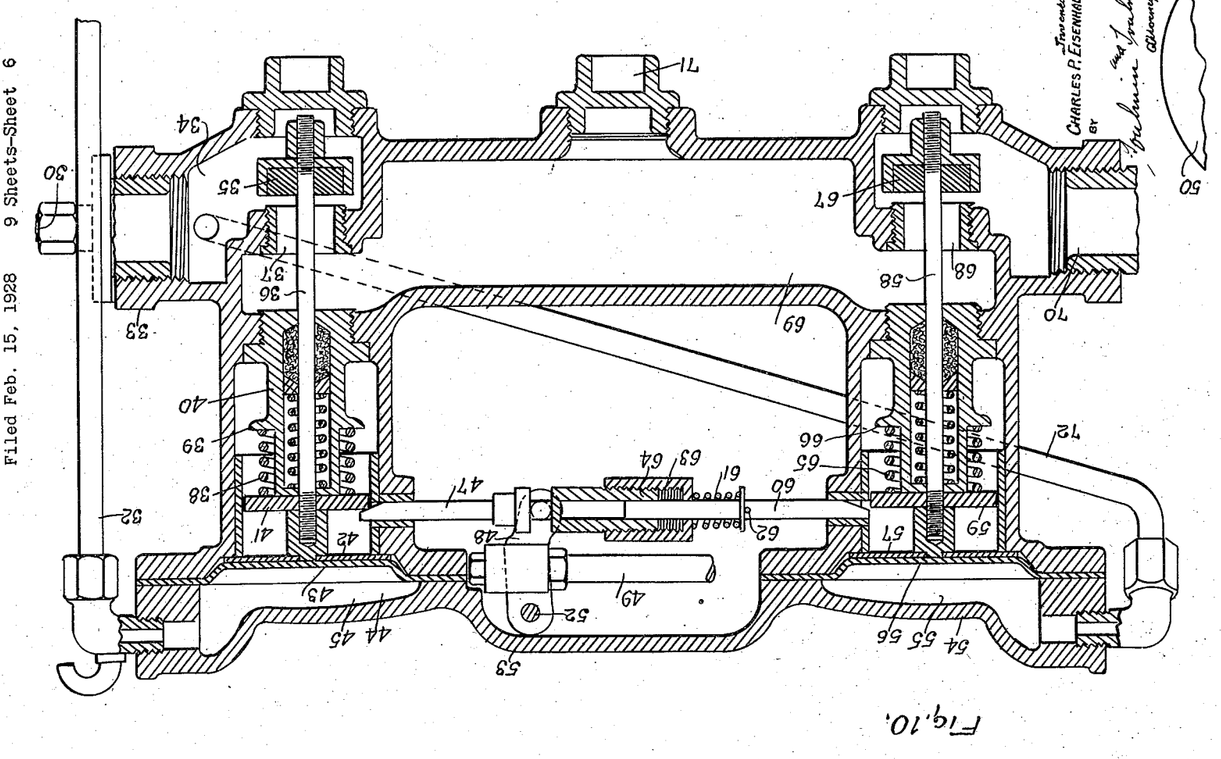
Figure 10 is a sectional view with parts in position to supply refill water.
Figure 11:
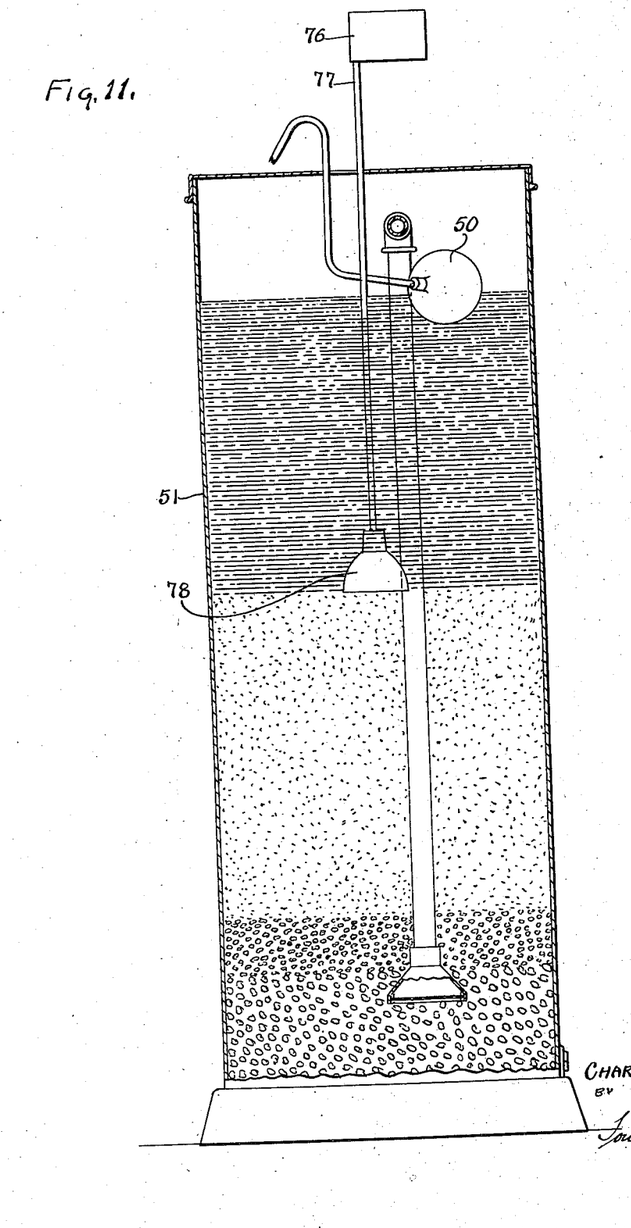
Figure 11 is a section through the brine tank.
Figure 12:
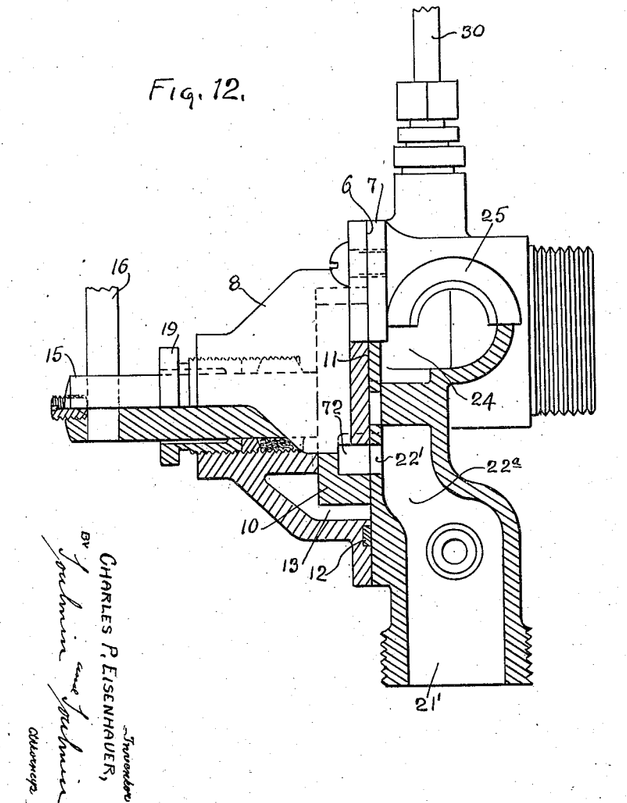
Figure 12 is a section on the line 12—12 of Figure 6.
Figure 13:
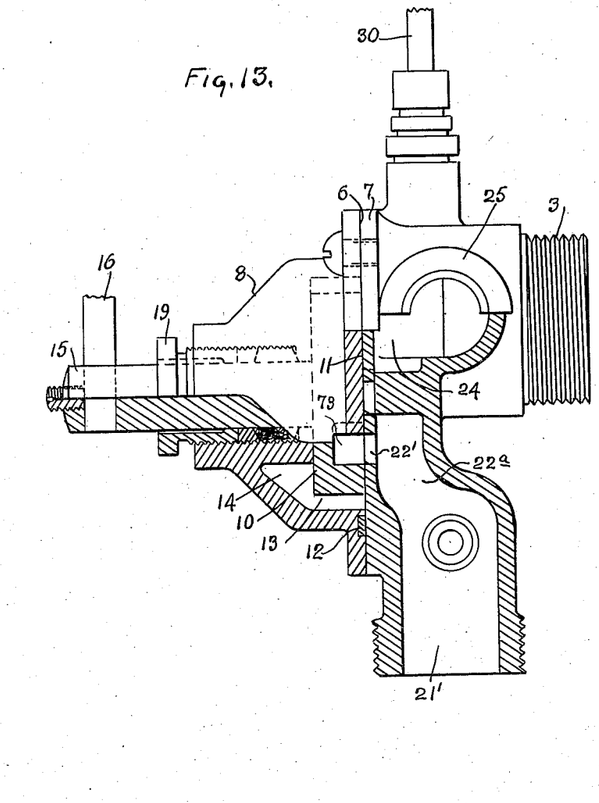
Figure 13 is a section on the same line of Figure 8.
Figure 14:
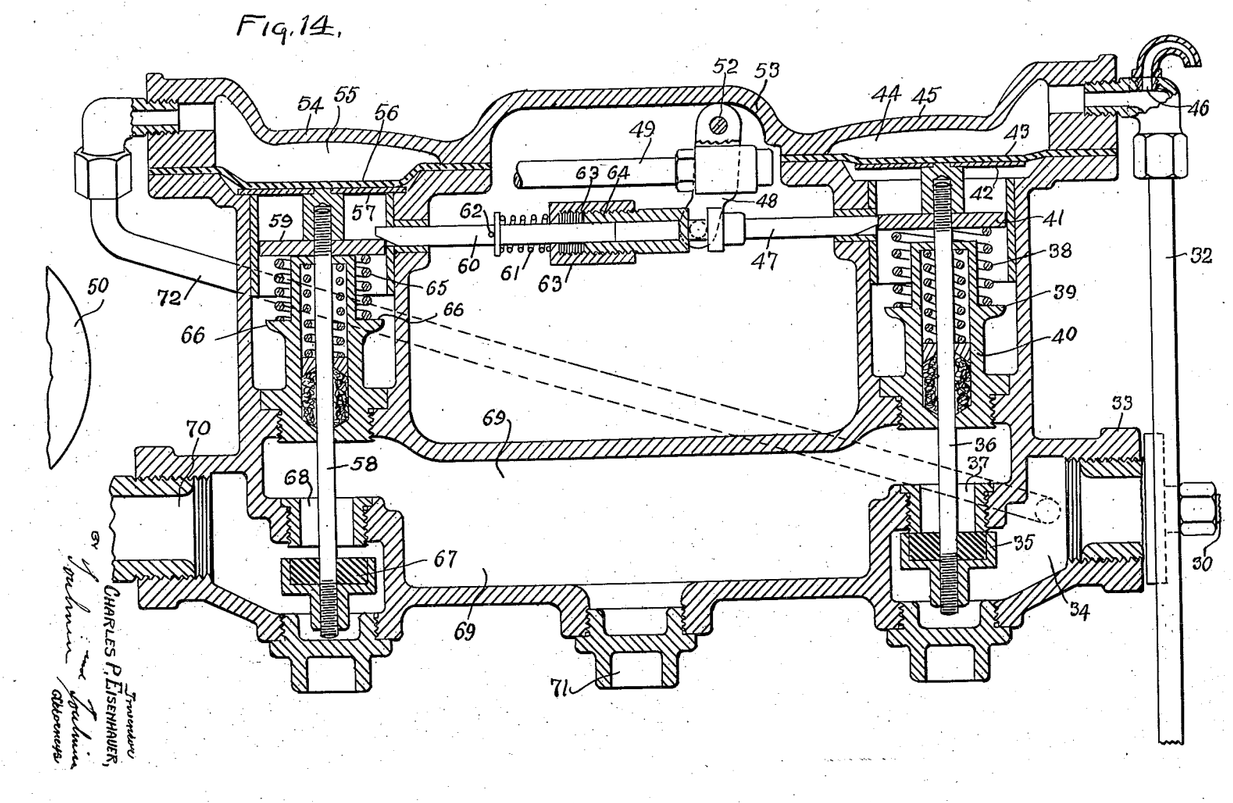
Figure 14 is a similar section to Figure 10, showing the softening position after refill has been completed.

Assuming the handle is in softening position and the valve is arranged as in Figures 5 and 6, the hard water will enter the passageway 4 thence travel around the groove 13 through the passageway 22a in the stationary part of the valve, thence through the passageway 21' through pipe 2 to the bottom of the softener, thence up through the softener to the top of the softener out the pipe 3 through the passageway 26, groove 72' in the rotor to the port 24, thence through the passageway 25 to service. When the valve is in this position, the rubber valve 73 pressed outwardly by the spring 73a closes the drain passageway 22.

When it is desired to regenerate the handle is moved to regenerating position against the stop 17 with the following result:

The hard water passes through the passageway 4 into the port 5, annular passageway 13 to the side port 74 in the rotor, thence through the port 75 into the port 28, pipe 3 to the top of the softener down through the softener and up through the pipe 2, the passageway 21', port 22 into the groove 72, thence across to the port 23 down the drain pipe 20.

As a result, the passage of the water through the restricted port 28 and injector sleeve 27 induces the flow of liquid through the pipe 30. To permit this liquid to flow from the brine tank 51, I utilize the pressure which is set up in pipe 32 through port 31 in the pressure chamber 44 to depress the refill valve to open it. The brine valve is already in locked open position so that the brine can flow through the port 37, passageway 69, port 68 and pipe 70 from the brine tank. This flow will continue until the float 50 drops down far enough to withdraw the locking pin 60 to permit the brine valve to close. The flow of the brine places a vacuum upon the chamber 55 through the pipe 72 so that there is no resistance to the closing of the brine valve. Hence, upon a predetermined quantity of brine being withdrawn the brine is shut off by the closing of the brine valve, but the descent of the float also serves to move the locking pin 47 into locking position to keep the refill valve 35 from closing. This locking takes place while the pressure is on the diaphragm 43 so that the refill valve is in depressed position where it can be so locked open. Upon turning the handle to softening position once more and the reversal of the direction of fluid the pressure in 32 will be relieved through the port 46 but the refill valve will not close because it is locked open with the locking pin 47 and will remain locked open until the float 50 rises due to the refilling of the brine tank 51 with additional refill liquid. This refill liquid is supplied through the pipe 30. It cannot, however, reach the brine tank until the brine valve 67 is open. This opening is effected by the pressure in the pipe 30 being communicated through the passageway 34, pipe 72 behind the diaphragm 55 which depresses the brine valve 67 opening it and holding it open so long as refill liquid is passing in the direction towards the brine tank and into the brine tank. When the requisite quantity of fluid is emptied into the brine tank to refill it, the float will rise to a point where the locking pin 47 will be withdrawn and the refill valve 35 will close as the accumulation of pressure liquid in the chamber 44 will have by that time drained out through the restricted passageway 46 known as the bleed.

Thus, all the operator has to do when he wants to regenerate his system is to throw the handle over to regenerating position and then return after an interval which he has discovered by test is necessary for the brine to pass through the softening material. The continued flow of liquid in the reverse direction after the brine is shut off serves to carry any accumulation of brine in the brine line and valves back to the brine line, preventing corrosion. When he returns and throws the lever over to softening position he may immediately leave the machine as the refilling will take place automatically simultaneously with the softening of the water if the water is being drawn through the system or will take place automatically even if the water is not being drawn through the water softening system.

Thus, with the single handle moved in either direction, the operator may secure the desired result without the use of a multiplicity of valves and without the labor attendant upon waiting while the system regenerates itself.

The usual indicating flag 76 carried on the shaft 77 supported on a float 78 is provided for indicating the salt level so as to indicate when salt must be placed in the brine tank.

This refilling of the brine tank with salt does not have to take place only at long intervals, as a large mass of salt can be dumped in and the brine taken off of the top where there is sufficient water to form a brine solution of the proper density.

It will be understood that, while I have shown this invention in connection with the water being softened passing in one direction and the softening and regenerating material, such as brine, passing in the other direction, it is possible to pass them both in the same direction without departing from the spirit of my invention.

It will be understood that I desire to comprehend within my invention such modifications as may be necessary to adapt it to varying conditions and uses.

Having thus fully described my invention, what I claim as new and desire to secure by Letters Patent, is:

1. In combination in a water softener, a brine and refill control system consisting of a passageway connecting a brine tank and a softening tank, a brine valve and a refill valve adapted to control the passage of fluid through said passageway, yielding means normally closing said valves, hydrostatic diaphragm means for opening said valves, a hydrostatic line leading from said passageway between the refill valve and the softening tank to the hydrostatic means of the brine valve, means for conveying hydrostatic pressure from the softening tank to operate the refill valve, locking means for alternately locking said respective valves, and a common float means in said brine tank adapted to operate said locking means, means to bleed as a drain the hydrostatic means of the refill valve, the hydrostatic means of the brine valve being drained by induced suction when the brine is flowed through said passageway to the softening tank.

2. In combination in a water softener, a brine and refill control system consisting of a passageway connecting a brine tank and a softening tank, a brine valve and a refill valve adapted to control the passage of fluid through said passageway, yielding means normally closing said valves, hydrostatic diaphragm means for opening said valves, a hydrostatic line leading from said passageway between the refill valve and the softening tank to the hydrostatic means of the brine valve, means for conveying hydrostatic pressure from the softening tank to operate the refill valve, locking means for alternately locking said respective valves, and a common float means in said brine tank adapted to operate said locking means, means to bleed as a drain the hydrostatic means of the refill valve, the hydrostatic means of the brine valve being drained by induced suction when the brine is flowed through said passageway to the softening tank, a hard water inlet line, a service line, a drain line, lines leading to respective ends of the softening tank, an injector in one of the lines leading to one end of the tank and a common valve means for controlling said lines, means for applying hydrostatic pressure to the refill valve and the passageway through which the brine and refill water passes.

3. In a valve mechanism, a stator having a hard water inlet passageway, a service passageway, a passageway to the top of the tank, a passageway to the bottom of the tank, a pipe connected to the passage to the top of the tank leading to a diaphragm chamber of a refill valve, a pipe leading from the passageway to the top of the tank to a brine tank for brine and refill water, an injector in said pipe leading to the top of the tank associated therewith for drawing brine through the brine pipe, an annular communicating groove adapted to connect with said pipes, a rotor having a valve groove and valve ports adapted to connect the inlet pipe and pipe to the bottom of the tank and the pipe from the top of the tank to service and the pipe to the refill valve in one position and in the other position to cut off the pipe to the refill valve in one position, to cut off the service pipe and connect the inlet pipe to the top of the tank and the pipe from the bottom of the tank to drain and thereby bring into operation the injector to draw brine through the brine pipe, a hydrostatically operated refill valve in the brine line, a hydrostatically operated brine valve in the brine line, locking mechanisms for said valves, yielding means for closing said valves, a float for operating said locks in the brine tank, a brine tank, a water softening tank and means for hydrostatically operating the brine valve.

In testimony whereof I affix my signature.

CHARLES P. EISENHAUER.